July 20, 1954  J. S. DONALDSON ET AL  2,684,069
PRECISION LINEAR-FRACTURE INSTRUMENT FOR HEART VALVE SURGERY
Filed July 5, 1952  6 Sheets-Sheet 1
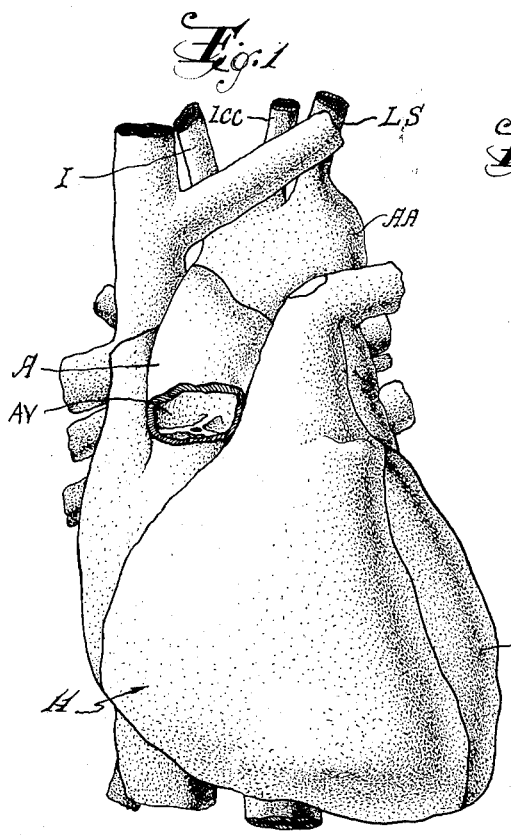
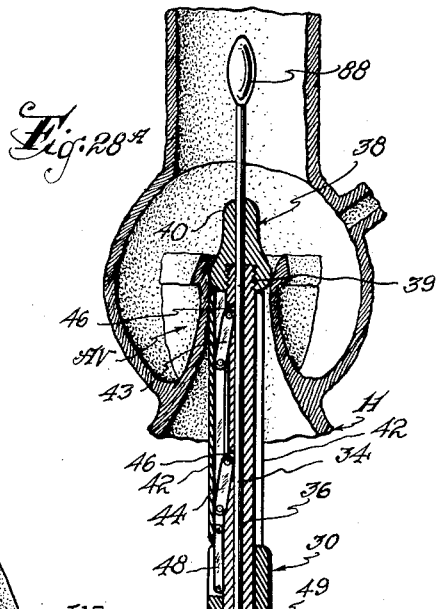
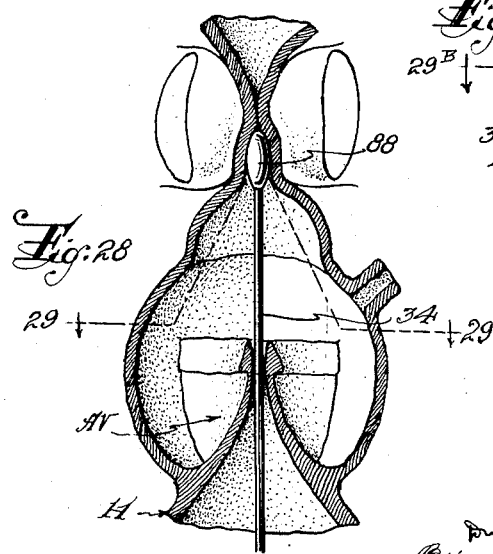
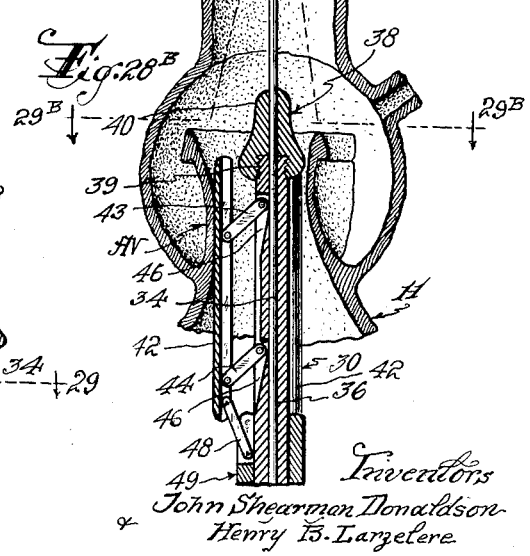
Inventors
John Shearman Donaldson
Henry B. Largelere
By Dudley B. Howard
Attorney July 20, 1954  J. S. DONALDSON ET AL  2,684,069
PRECISION LINEAR-FRACTURE INSTRUMENT FOR HEART VALVE SURGERY
Filed July 5, 1952  6 Sheets-Sheet 2
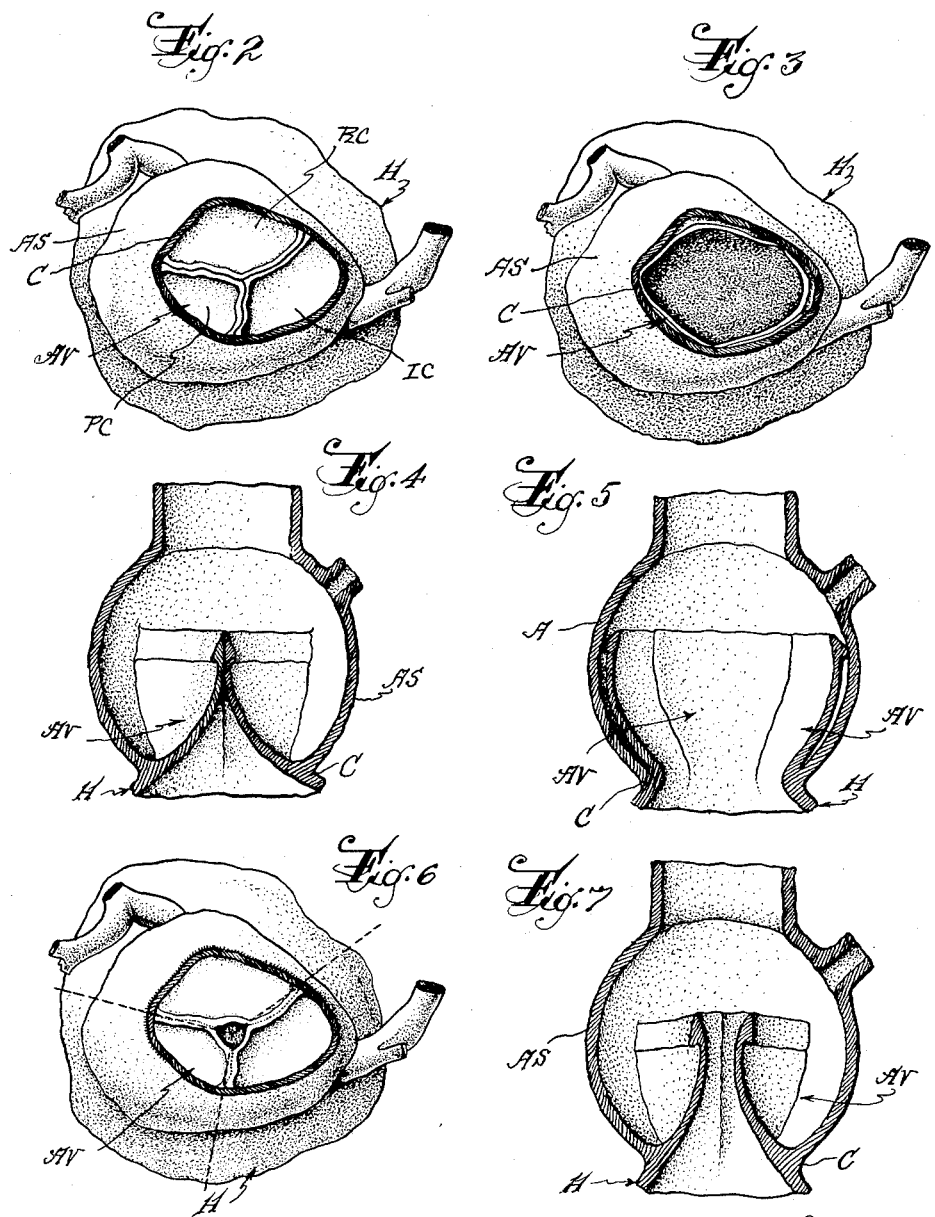
Inventors
John Shearman Donaldson
Henry B. Larzelere
By Dudley B. Howard
Attorney

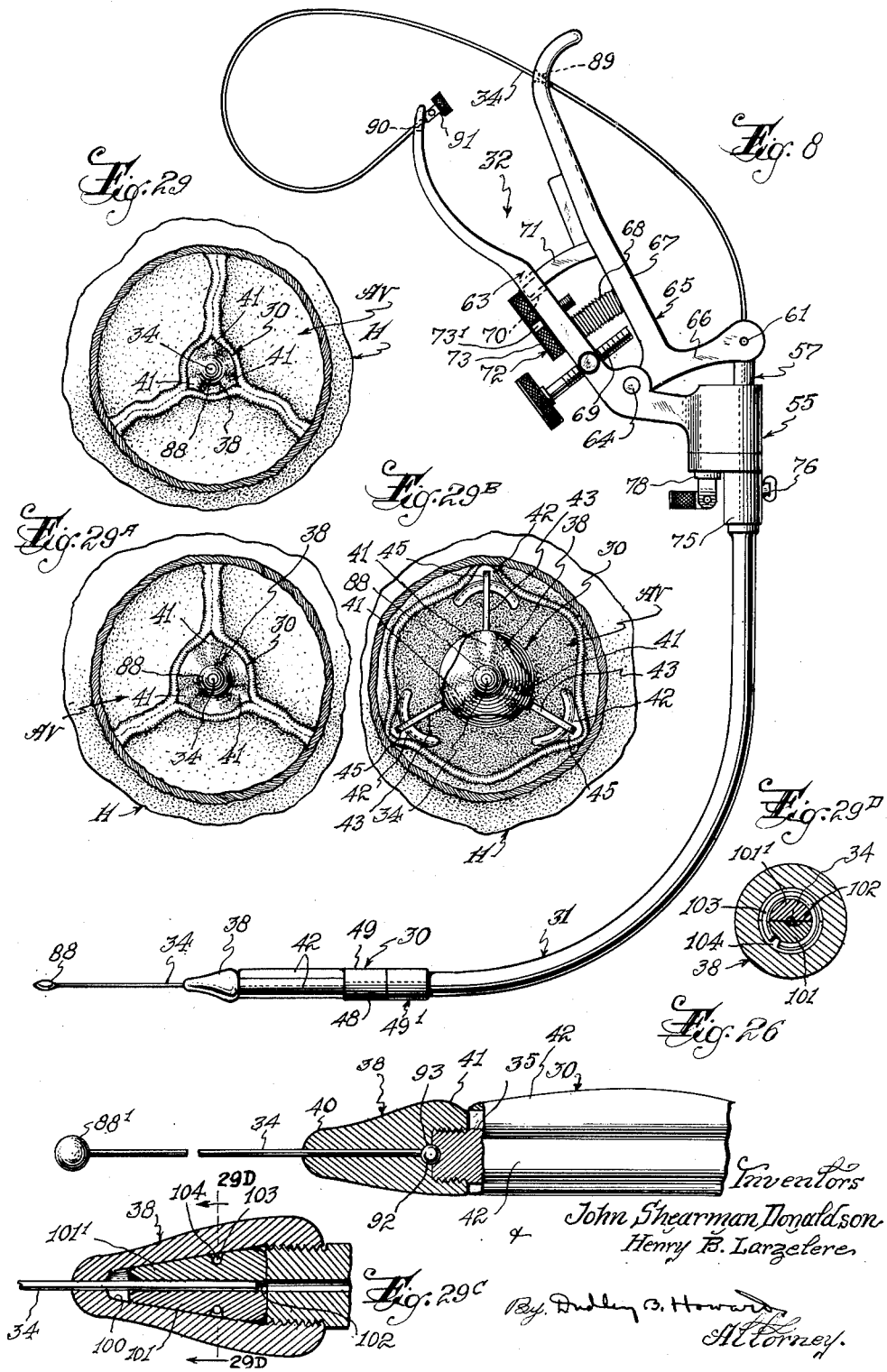

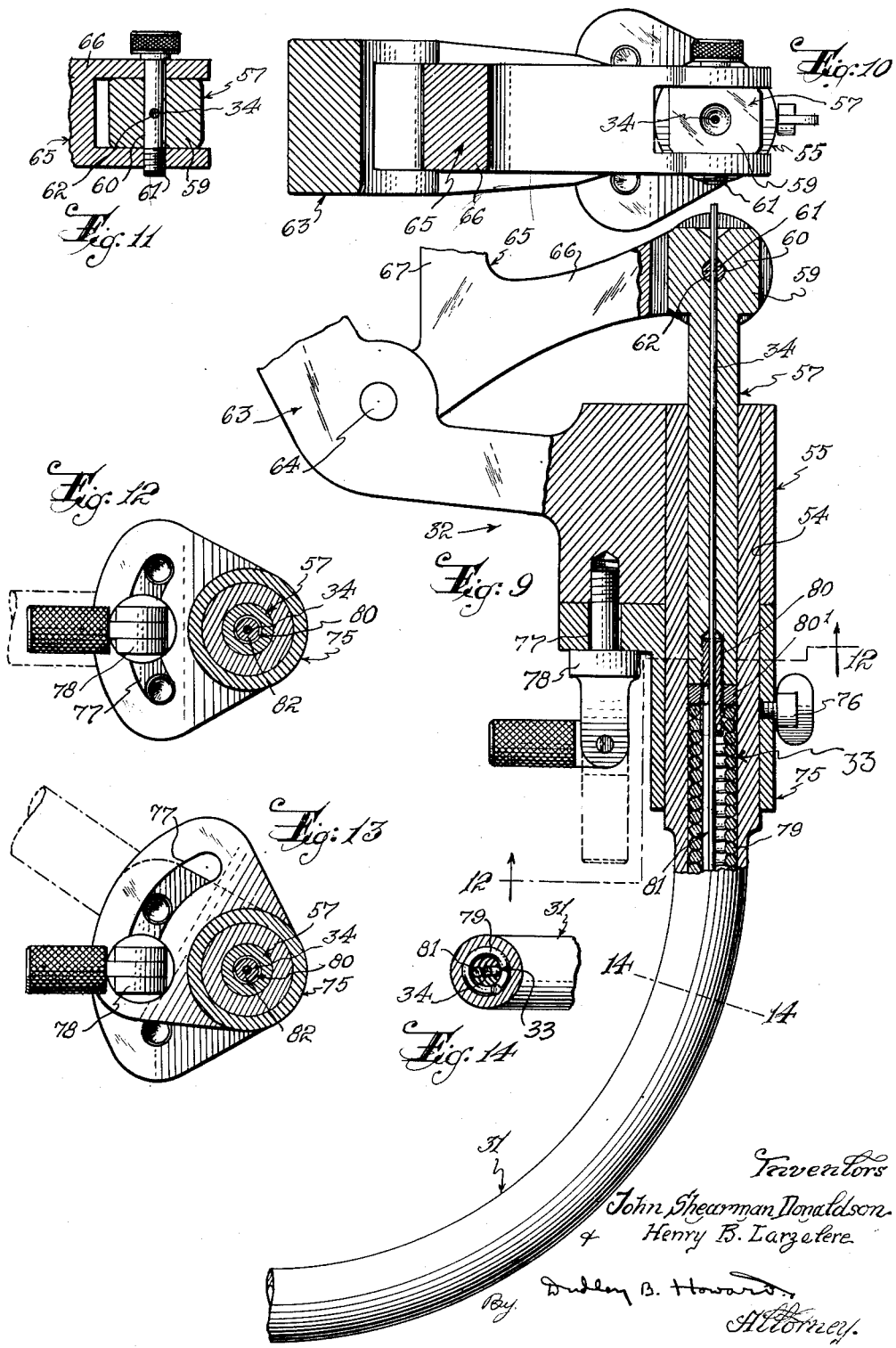

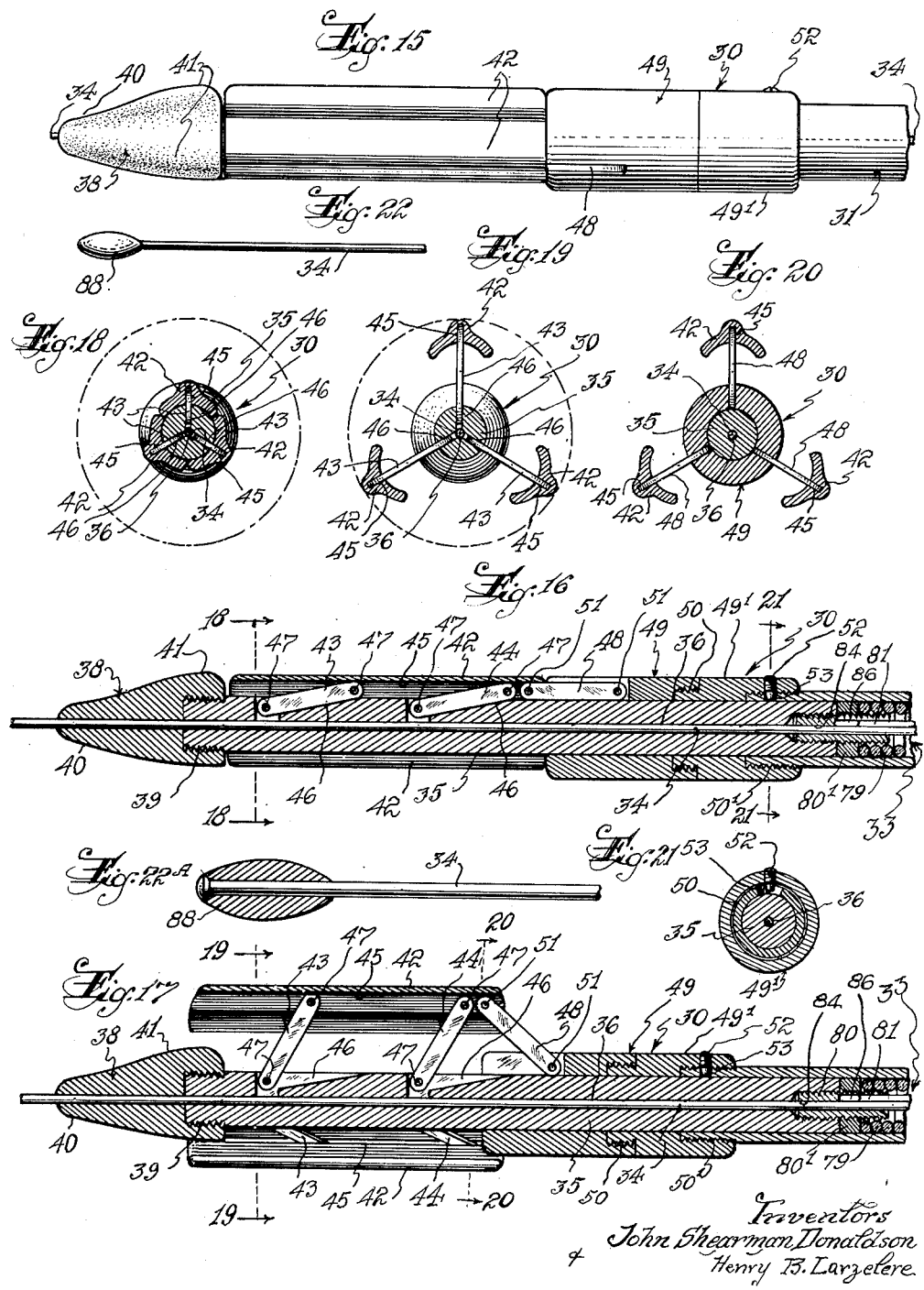

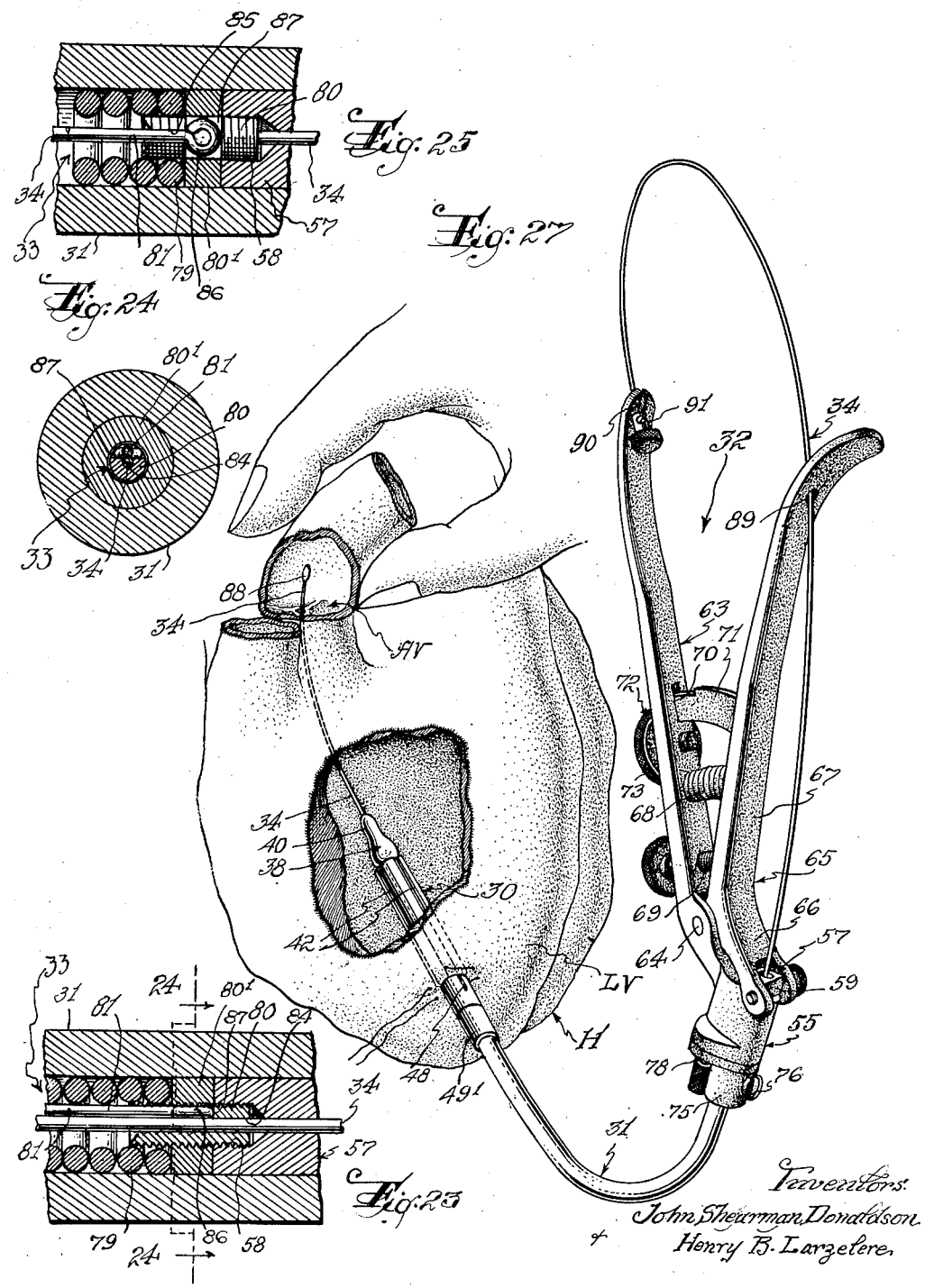

UNITED STATES PATENT OFFICE 2,684,069

PRECISION LINEAR-FRACTURE INSTRUMENT FOR HEART VALVE SURGERY

John Shearman Donaldson, Chatham, N. J., and Henry B. Larzelere, Philadelphia, Pa.; said Larzelere assignor to said Donaldson Application July 5, 1952, Serial No. 297,342

29 Claims. (Cl. 128—303)

The invention relates in general to surgical instruments and has particular reference to a special instrument for use in the surgical relief of stenosis of valves of the human heart.

Stenosis of a heart valve is a disease process characterized by fusion of the valve commissures, or angles, which lines of fusion are often found to be thickened by calcareous deposits. Apparently, the disease process incipiently rings the valve and then progresses inward from the peripheral cuff along the normally unattached margins or lips of the valve cusps toward the center of the valve. In an advanced stage of this condition, the valve will have become so extensively affected by fusion of the cusp margins that it can open only far enough to provide an orifice of greatly constricted diameter during a pumping impulse. In consequence of this stricture, the blood spurts through the orifice in a high-pressure jet instead of the free flow essential to proper circulation.

Prior to the present invention, the surgery attempted for relief of valvular stenosis usually was in the nature of a valvulotomy operation which involved cutting of a relief slit in the valve at a convenient location. Such indiscriminate cutting, even if it does not cause severe hemorrhage and possible insufficiency, is quite likely to create scars that soon destroy the beneficial effects of the operation. These dangers led to the development of a technique called "valvular commissurotomy" by which it was endeavored to direct the cutting along the commissures and thereby avoid subsequent readhesion. This technique was moderately successful in treatment of the bicuspid mitral valve, but was employed with great difficulty and danger to the patient in treatment of stenosis of the aortic valve. In any valve, the fused margins are not straight, so the straight cutting strokes which must be practiced when operating without aid of vision are almost certain to incise tissues bordering the commissures with the serious consequences already discussed. The danger of misdirected cutting is greatly aggravated in the case of the aortic valve, which is tricuspid in structure and thus requires cutting in three directions instead of along only one line as when operating on a bicuspid valve.

In treatment of stenosis of the mitral valve, commissure enlargement by fracture technique has been practiced, such as "finger fracture" or by use of a dilator instrument having blunt engaging members, but the results have not been totally satisfactory even in operation upon that relatively simple and easily accessible valve. Fracture with a blunt, broad-faced finger or a dilator having engaging members of similar form is very likely to cause rupture or tearing of the tender cusp tissues that border on the commissures. The dangers attending the fracture technique heretofore practiced are increased when applied to a stenotic aortic valve, due to its tricuspid structure and its comparatively inaccessible position deep within the heart where it cannot be entered directly and is invisible during the operation.

With the above-enumerated disadvantages and hazards of the earlier apparatus and operative techniques in mind, it has been our express purpose to device an improved instrument which operates on the fracture principle and is in the dilator class but which exerts precise linear parting pressure along each line of cusp fusion in a direction oblique to the plane of the cusps and progressively from the central orifice which had not yet been closed radially outward toward the valve cuff. In other words, the damage is undone in a direction opposite to that in which it progressively developed.

To be more explicit, the new instrument has an operating head that penetrates the affected valve and has elongated parting elements that extend lengthwise of the valve axis and are equal in number to the commissures and similarly arranged angularly about said axis. Each of the parting elements is wedge-shaped in cross-section to form a blade having an outer parting or fracturing edge that is dulled by being rounded so that it cannot cut any of the cusp tissues with which it may come into contact but is sufficiently acute in form to fracture the fused cusp margins along the line of adhesion in a precisely directed manner. To this end, the fracturing edges of all parting elements, or blades should be substantially narrower in width than the disease processes to be fractured. The movement of the parting elements is such that their fracturing edges exert the oblique pressure already described as well as wedging action tangential to an imaginary circle through the concentric points of contact between the fracturing edges of the respective parting elements and the fused cusp margins at any moment during the parting action. In other words, there is three-directional application of forces with a resultant component oblique to the plane of the valve cusps.

To further clarify the precise manner in which the fracturing edges of the parting element blades operate to part, or separate, the adhered cusp margins or commissures without injury to the valve cusps themselves, it may be explained that the disease process which unites the contiguous radially extending edges of adjoining cusps is in the form of a thickened strip or web of foreign matter, such as a calcareous deposit. This deposit usually overlaps the cusp margins and must be fractured precisely along the thin line which is coincident with the meeting edges or margins of the valve cusps if damage to the delicate cusp tissues is to be avoided. That is why each parting element blade is provided with a fracturing edge that is sufficiently thin to wedge its way between the contiguous cusp margins to safely part the same but is dulled so that it cannot possibly cut into or through any cusp tissues. In its wedging penetration between the cusp margins, the fracturing edge of each parting element blade engages and brings fracturing pressure to bear against the web or strip of foreign material only. Consequently, it is only this foreign deposit that is fractured and that action occurs only along a line intervening between cusp margins. There is no contact of the fracturing edges of the parting element blades with the valve cusps on either side of said intervening line such as otherwise might tend to tear or bruise cusp tissues.

Another important object of the invention is to provide the instrument with an attenuated, slightly resilient, flexible guide member which projects ahead of the entering wedge of the operating head in preferably centered relation thereto for the purpose of aiding the surgeon in locating the orifice of the diseased valve before insertion of the rigid operating head inside the appropriate heart cavity. This guide member serves as a "feeler" which may be slowly and carefully advanced through the invisible regions of the heart cavity in a direction calculated from knowledge of the anatomical structure to be moving toward the affected valve. Whenever contact with an obstruction is felt, the surgeon is able to recede from the obstruction and try an altered direction of approach. Due to its flexibility, the guide member will be deflected from the obstruction without exertion of injurious pressure thereon. Then, when the direction of further approach has been changed, the guide member will resume its straight form in alignment with the operating head, due to its resiliency, so that the surgeon may know that further progress will follow the axis of said operating head, which is exteriorly located at this stage and can be aimed in the new direction. When the valve orifice has eventually been located and penetrated by the guide member, its function as a feeler has been successfully ended and it now is ready to assume its new function as means for accurately guiding the operating head of the instrument along its path to the valve.

The above and other objects, features and advantages of the present invention will be more fully understood from the following specific description when considered in connection with the accompanying drawings, in which:

Fig. 1 is a view of a human heart in anterior or sternocostal aspect, showing the same partly broken away to reveal the location of the aortic valve.

Fig. 2 is a fragmentary top plan view of a healthy aortic valve in closed condition; Fig. 3 is a similar view, showing the valve open; Fig. 4 is a vertical longitudinal section of the valve in the condtion shown in Fig. 2; Fig. 5 is a similar view of the valve in the condition shown in Fig. 3; Fig. 6 is a view similar to Fig. 2, showing a stenotic aortic valve in open condition and representing in dash lines the usual direction followed by incisions made in a valvulotomy operation; and Fig. 7 is a vertical longitudinal section of the same.

Fig. 8 is a side elevation of the complete dilator instrument, showing the operating head in collapsed condition; Fig. 9 is a large scale detail fragmentary side elevation, partly in section, of the manipulating mechanism and the supporting neck; Fig. 10 is a top plan view of the instrument as shown in Fig. 9; Fig. 11 is a transverse section on line 11—11 of Fig. 9; Fig. 12 is a similar view on line 12—12 of Fig. 9; Fig. 13 is a similar view showing a change in angular arrangement of supporting neck and manipulating mechanism; and Fig. 14 is a transverse section on line 14—14 of Fig. 9.

Fig. 15 is a large scale fragmentary side elevation of the operating head in collapsed condition; Fig. 16 is a longitudinal section through the operating head as shown in Fig. 15; Fig. 17 is a view similar to Fig. 16 showing the operating head expanded; Fig. 18 is a transverse section on line 18—18 of Fig. 16; Fig. 19 is a similar view on line 19—19 of Fig. 17; Fig. 20 is a similar view on line 20—20 of Fig. 17; and Fig. 21 is a similar view on line 21—21 of Fig. 17.

Fig. 22 is a detail fragmentary side elevation of the front end portion of the guide member; and Fig. 22A is an enlarged longitudinal section of the same.

Fig. 23 is a large scale fragmentary longitudinal section of the supporting neck and screw plug at the rear end of the power transmission element; Fig. 24 is a transverse section on line 24—24 of Fig. 23; and Fig. 25 is a view similar to Fig. 23 but taken on a plane disposed at 90 degrees to the section represented in said Fig. 23.

Fig. 26 is a fragmentary, large scale side elevation, partly in section, of the operating head, showing a modified form of guide member.

Fig. 27 is a perspective view of the dilator instrument in use in an operation upon a diseased heart, showing the operating head during insertion through the heart wall incision after the aortic valve has been penetrated by the guide member; Fig. 28 is a large scale longitudinal section of the aortic valve during the step immediately preceding that shown in Fig. 27; Fig. 28A is a similar view showing initial partial penetration of the valve by the nose-piece of the operating head; Fig. 28B is a similar view showing the movable parting members expanded after final penetration of the operating head; Fig. 29 is a transverse section on line 29—29 of Fig. 28; Fig. 29A is a similar view showing complete penetration of the valve by the nose-piece; and Fig. 29B is a similar view on line 29B—29B of Fig. 28B.

Fig. 29C is a fragmentary longitudinal section of a modified nose-piece in applied position on the body of the operating head; and Fig. 29D is a cross-sectional view on line 29D—29D of Fig. 29C.

Referring now in detail to the drawings, wherein like reference characters designate corresponding parts in the several views, Fig. 1 represents a human heart H in anterior or sternocostal aspect. This view has been sectionalized partially to reveal the location of the aortic valve AV, which has been chosen as the subject for demonstration of our new operative technique with the improved surgical instrument. The reason for this choice is in the fact that treatment of stenosis of that particular valve is complicated by difficulty of access and by its tricuspid structure. Consequently, more should be learned about the invention from consideration of the most exacting problems with which operative procedure and instrument can be confronted.

It will be observed that the aortic valve is located deep within the heart at the juncture of the ascending aorta A with the left ventricle LV. The aortic arch AA leads to arteries of the trunk and lower extremities. Rising from aortic arch AA are three important arterial branches which lead to the brain. These are the innominate artery I, the left common carotid artery LCC and the left subclavian artery LS.

With this general orientation of pertinent parts of the heart, attention is now invited to the comparative series of views of the aortic valve represented in Figs. 2 to 7, inclusive. Of these, Figs. 2, 3, 4 and 5 disclose a healthy valve in various aspects. Figs. 2 and 4 show the valve closed in top plan and in longitudinal section, respectively. Figs. 3 and 5 show how wide the cusps open when blood is being forced outward through the valve into the aorta from the left ventricle during muscular contraction of the latter. By way of contrast, Figs. 6 and 7 show both aspects of the open condition of a valve which is affected with stenosis.

With particular reference to the structure of the aortic valve, it will be observed that there are three cooperative cusps, viz: the right cusp RC, the left cusp LC and the posterior or non-coronary cusp PC. All of the cusps are attached along their outer margins to cuff C of the aortic sinus AS. The normally unattached margins meet in the closed condition of the valve along wavy lines which radiate from the center of the valve at an angular separation of substantially 120 degrees.

In Fig. 6, straight dash lines radiating from the center of the stenotic valve in generally superimposed relation to the actual lines of commissure fusion of the valve cusps indicate the lines which cutting would tend to follow under the earlier, extremely dangerous valvulotomy technique.

Turning now to Figs. 8 to 26, the structure of the improved commissure dilating instrument in the form peculiarly adapted to the treatment of stenosis of the aortic valve will be described.

The complete instrument comprises five major elements, viz: (1) operating head 30; (2) tubular curved neck 31 which supports and directs the operating head; (3) manipulating mechanism 32 which in turn supports the neck; (4) power transmission means 33 extending through the neck from the manipulating mechanism to the operating head; and (5) guide member 34 projecting forwardly from the operating head.

Operating head 30 has an elongated body 35 which is provided with a through bearing bore 36 for passage of guide member 34 (Figs. 15 to 21). Guide member 34 has close-fitting bearing contact within bore 36. The rear end of body 35 is adapted to be removably inserted in the forward end portion of neck 31 for limited longitudinal reciprocation therein. The rear end of body bore 36 is enlarged and internally screwthreaded to provide a connecting socket 37 for a purpose to be described fully hereinafter. The front end of body 35 is provided with a nose-piece 38, which is preferably removably fitted thereon, as by screw-threaded connecting means 39. Nose-piece 38 is generally circular in cross-section and is forwardly tapered to provide an entering wedge 40 for insertion into the central orifice of the valve undergoing treatment. Spaced equally about nose-piece 38 are three radially projecting, longitudinally extending fixed parting members in the form of fins or ridges 41 for registration with the lines of commissure fusion of the three adhered cusps of the aortic valve. Fins 41 are wedge-shaped in cross-section to form outwardly presented axially extending acute blades having outer fracturing edges that are dulled by being smoothly rounded to avoid any cutting action, and they are tapered edgewise forwardly into smooth mergence with the peripheral surface of entering wedge 40 for streamlining and oblique stroking action. The width of the outer fracturing edge of each fin 41 is substantially narrower than the commissure-fusing disease process. The maximum radial projection of parting fins 41 is carefully calculated to exert only slight initial parting action on the respective disease processes.

In rear of nose-piece 38, three elongated, axially extending, bar-like parting members 42 are mounted on body 35 for radial expansion on front and rear links 43 and 44, respectively, that are arranged in tandem to maintain said parting members substantially parallel to the axis of said body at all times. The three parting members are arranged 120 degrees apart about the axis of body 35 and are aligned with fixed parting fins 41 of nose-piece 38. Each parting member 42 is wedge-shaped in cross-section to form an outwardly presented axially extending acute blade having an outer fracturing edge that is dulled by being rounded to match the corresponding fixed parting fin 41 in cross-sectional form and size, and the ends are beveled slightly to facilitate safe passage through the heart wall incision and the valve during insertion and withdrawal. The inner longitudinal face of each parting member 42 is shaped to fit closely against the opposed peripheral face of body 35 and is longitudinally slotted as at 45 to countersink the outer half portions of the corresponding links 43 and 44 when the parting members as a unit are collapsed against body 35. The inner half portions of links 43 and 44 for each parting member 42 are similarly countersunk in slot 46 provided in body 35. The respective ends of links 43 and 44 are pivotally connected to body 35 and parting members 42 by tangential pivot members 47 that intersect slots 46 and 45, respectively. Due to the comparatively larger solid mass of metal in body 35, it is practicable to employ screws as the pivot members for attaching the appropriate ends of links 43 and 44 thereto because the size requirement will not be prohibitively small. On the other hand, the metallic mass of parting members 42 is so reduced, that it has been found to be desirable in the interest of strength to use pins for attaching the opposite ends of links 43 and 44 to said members. Both the screws and pins preferably are made of stainless steel. By making the pins circular in cross-section and very slightly tapered from end to end and by correspondingly shaping the receiving holes in the body of the operating head, the pins will fit with a secure pressed-joint but may be easily driven out when necessary.

The foregoing practical problems of manufacture and maintenance are cited in detail to demonstrate the point that in a surgical instrument of this kind every structural detail is important.

For instance, the operating head, which has to penetrate the heart wall and its diseased valve, must be of the very minimum cross-sectional size consistent with strength of its moving parts. That explains the countersinking of the mounting links for the expansible and contractible parting members and the tiny size of the pivoting members therefor.

To proceed with description of the expansible and contractible parting members 42, their radial thickness is such that their outer fracturing edges will be substantially flush with the outer fracturing edges of fixed parting fins 41 of nose-piece 38 when the former are in collapsed condition. Links 43 and 44 are arranged so that the front ends of parting members 42 will be contiguous to the rear shoulder of nose-piece 38 when the said members are collapsed but will be thrust forward beyond the collapsed position when said members are expanded, whereby the outer fracturing edges thereof will be given a forwardly oblique resultant motion to afford the improved commisure-parting action previously mentioned herein.

Expanding motion is directly applied to the respective parting members 42 through the medium of connecting links 48 by collar 49 which is slidable on body 35 and has a screwthreaded socket 50 at its rear end for detachable engagement with the screwthreaded forward end of intervening swivel extension-piece 49', which latter in turn has a screwthreaded socket 50' for loosely threaded engagement with the screwthreaded forward end of neck 31. Connecting links 48 are terminally pivoted to parting members 42 and collar 49 by means of tangential pivot members 51, which preferably are in the form of screws. At this point, it may be appropriate to remark that, whereas it does not matter whether the arrangement of links 48 is parallel to the axis of sliding movement of body 35 and neck 31 when parting members 42 are collapsed, it is quite desirable to insure the arrangement of links 43 and 44 shown in Fig. 16, wherein the forward ends of said links are located radially inward of the rearward ends thereof when the parting members are collapsed, so that these links will be prevented from assuming dead-center positions such as would lock the parting members against expansion upon exertion of axial forward thrust to said parting members from collar 49 through connecting links 48.

In order to permit the fixed parting fins and expansible parting members of operating head 30 to adjust themselves automatically into alignment with the adhered margins of an affected heart valve, when the surgeon's manual attempt at such alignment may be slightly imperfect, swivel extension-piece 49' and the front end of neck 31 may be swiveled to a limited degree. One way of accomplishing this swiveling is by making the screw threads which unite swivel extension-piece 49' and neck 31 loose-fitting as already described and by providing said extension-piece with a set-screw 52 and said neck with an arcuate slot 53 in which the inner end of set-screw 52 is engaged (Figs. 16 and 21). The desired limit of permissible swiveling action is determined by the length of slot 53. Only slight play is desirable because, otherwise, the surgeon will be deprived of sufficient control over adjustment of operating head 30.

Neck 31 is curved as shown to facilitate access to the heart wall incision through the chest cavity from the window which has been created in the chest wall and also to enable the surgeon to hold the instrument steady in any angular position and to make precise angular changes of position. At its rear end, neck 31 is detachably fitted in a through socket 54 provided in the body 55 of manipulating mechanism 32. A thrust plunger 57 having a central through bore for passage of guide member 34 is mounted for reciprocation in the rear end portion of neck 31 in protruding relation thereto (Figs. 9 and 10). The inner end of plunger 57 is provided with a screwthreaded socket 58 for a purpose to be described presently. The protruding outer end of plunger 57 has a head 59 provided with a cross-hole 60 for reception of a pivot pin 61 that has a cross-passage 62 adapted to register with the bore of said plunger for slidable reception of guide member 34.

A handle 63 preferably formed integral with body 55 extends diagonally from said body and normally is disposed in the plane of neck 31. Pivoted to handle 63 by removable pivot member 64 is a power lever 65 which has its inner, short arm 66 bent substantially at right angles to long, manipulating arm 67. The extremity of short arm 66 of power lever 65 is pivotally connected to head 59 of plunger 57 by pivot member 61 with sufficient play in the joint to accommodate the relative rocking and reciprocating motion of lever 65 and plunger 57.

Resilient means, such as spring 68, is provided to urge handle 63 and long arm 67 of power lever 65 apart so as to exert inward thrust upon plunger 57. Adjustable stop means, such as screw 69, serves to limit closing motion of handle 63 and long arm 67 of power lever 65 to a degree calculated by the surgeon to be best suited to the size of the valve to be treated so that undue expansion of the expansible parting members 42 of operating head 30 cannot occur. Also, a safety device to insure against premature accidental closing motion of handle 63 and long lever arm 67 has been provided in the preferred form shown, wherein said handle is provided with a slot 70 for penetration by an arcuate arm 71 projecting inward from said long arm when said handle and long arm are pressed toward each other. A rotatable locking stop member 72 is mounted on the outside of handle 63 and has a head 73 overlying slot 70. A marginal slot 73' in head 78 may be turned into registration with slot 70, at the will of the surgeon, to permit outward penetration of slots 70 and 73' by arcuate arm 71 and consequent closing motion of handle 63 and long lever arm 67.

In order that neck 31 may be rotatably adjusted in position in body 55 to change the angular relation of the plane of said neck to that of handle 63 and power lever 65, as may be required in accommodation to operative procedure in difficult cases, a sleeve 75 is fitted on the rear end portion of neck 31 immediately in advance of said body 55. Sleeve 75 is affixed to neck 31 by suitable releasable means, such as set-screw 76. To secure sleeve 75 and affixed neck 31 in angularly adjusted position relative to body 55, an arcuate slot 77 has been provided in said sleeve for reception of a clamping bolt 78 which is screwed into the front end of said body 55 (Figs. 9, 10, 12 and 13).

Means 33 for transmission of power thrust from plunger 57 to operating head 30 through the interior of tubular neck 31 is shown in detail in Figs. 9, 16, 17, 23 and 25. Due to the curvature of neck 31, the power transmission means must be flexible, but it is a requirement of equal importance that it shall not be longitudinally expansible nor contractible. For this purpose, we have chosen a coil spring 79 which extends through neck 31. Since it is desirable to make the power transmission means available as a self-contained unit capable of end-for-end reversal, either by intention or by accident, without any difference in functioning, identical screw-plugs 80—80 are fitted to the opposite ends of spring 79 and are tied together by a tie-wire 81, which latter extends through spring 79 along the inner side of its longitudinal curvature.

Each screw-plug 80 is adapted to fit snugly in either end of spring 79 for screwthreaded engagement either with socket 37 of body 35 of operating head 30 or with socket 58 of plunger 57 of manipulating mechanism 32. Screw-plug 80 is provided also with an axial bearing bore 84 for passage of guide member 34. A longitudinal slot 85 provided in one side of screw-plug 80 serves to countersink the corresponding end portion of tie-wire 81. A head, or bead, 86 formed on each extremity of tie-wire 81 is adapted to be anchored in a cross-slot 87 provided in screw-plug 80 in communication with its longitudinal slot 85. To confine and lock either head 86 of tie-wire 81 in assembled relation to one of the screw-plugs 80, a screwthreaded locking sleeve 80' is engaged with said screw plug.

In its preferred form disclosed in Figs. 8, 9, 16, 17, 22A and 27, guide member 34 is adjustable in effective forwardly protruding length and takes the form of a long, slender wire, which preferably is made of stainless steel. It is very important that the wire shall be quite flexible and yet sufficiently resilient to have a constant tendency to return to straight form after being deflected in any direction to a degree not involving a permanent change in shape. A protective bead 88 is provided on the forward end of guide member 34 in any practicable manner.

Bead 88 is preferably circular in cross-section, slightly elongated, and smoothly streamlined from front to rear in order to avoid injury to any parts of the patient's anatomy which may be encountered during penetration of the heart and its affected valve, and also to reduce frictional resistance to entry and withdrawal. The diameter of bead 88 must be such that it will be sensible to the surgeon's touch when it has entered the aorta through the orifice in the aortic valve and the surgeon compresses the walls of the aorta with thumb and finger in seeking to determine the location of said bead as represented in Fig. 28. However, bead 88 should be small enough to freely penetrate the valve orifice in the final stage of the disease which is progressively narrowing said orifice.

In assembling guide member 34 with operating head 30 and the other elements of the dilating instrument proper, the end of said member remote from bead 88 is threaded through the aligned bores of said operating head, power transmission means 33 contained in neck 31, plunger 57 of manipulating mechanism 32, and pivot pin 61. The free end of long arm 67 of power lever 65 is bent upward and provided with an aperture 89 for slidable reception of guide member 34. To aid in restraining the rear end of guide member 34 during operational use of the instrument so that said end may be kept out of the surgeon's way, the free end of handle 63 is bent upward and provided with a deep notch 90 in which said end of member 34 may be engaged in a reversely directed arrangement (Figs. 8 and 27). A keeper clamp 91 is engageable with the free end of guide member 34. By positioning keeper clamp 91 inside the bent portion of handle 63, the resilient tendency of guide member 34 to straighten out will hold said keeper clamp firmly pressing against the inner face of the bent portion of the handle.

A modified form of guide member is shown in Fig. 26. In this instance, the effective length of guide member 34 is permanently established and its rear end is provided with an enlargement 92 which is anchored in a socket 93 provided in nose-piece 38 of operating head 30. Bore 36 of body 35 of operating head 30 extends from the tip of nose-piece 38 only as far back as socket 93. In fact, the principal reason for this modification is to strengthen body 35 in the region of parting members 42 and links 43, 44 and 48 by elimination of bore 36 in rear of nose-piece 38.

Figs. 29C and 29D disclose a further modification of nose-piece 38 which has been devised to adjustably accommodate a short guide member 34. In this instance, the rear end of guide member 34 is not provided with any enlargement such as that indicated at 92 in Fig. 26 to determine the precise effective protruding length of said guide member. On the contrary, a guide member of appropriate general length for use during a particular operation may be selected. This guide member will have a plain cut rear end in order that it may be inserted in the bore of nose-piece 38 without having to unscrew the latter from body 35 of operating head 30. The initial depth of penetration of the bores of nose-piece 38 and body 35 should be such that the exposed or effective length will be sufficient for the estimated probable distance of heart and aorta penetration during valve location by use of the guide member. Nose-piece 38 is modified by provision of a forwardly tapered socket 100 which opens through the tip bore. A pair of mated, wedge-shaped clamping jaws 101—101' are loosely mounted in socket 100. Jaws 101—101' have their meeting faces longitudinally grooved as at 102 to fit guide member 34. When nose-piece 38 is screwed tightly onto body 35, the front end of the latter will press clamping jaws 101—101' forwardly and the tapered wall of socket 100 will exert radial wedging action on said jaws to clamp guide member 34 securely therebetween. In order to prevent accidental separation of clamping jaws 101—101' whenever nosepiece 38 is detached from body 35, an arcuate spring 103 is fitted into circumferential groove 104 provided in said jaws. Whenever it is desired to shorten the effective length of guide member 34, nose-piece 38 may be unscrewed slightly to release the grip of the jaws, whereupon guide member 34 may be pushed in to the required extent. If the dilator instrument is of the preferred form, wherein all elements from nose-piece to manipulating mechanism are bored for passage of the guide member, the excess length of said guide member will be accommodated in said bore. On the other hand, if the solid body 35 disclosed in Fig. 26 is incorporated in the instrument design, it will be necessary to cut off the excess length or to select a guide member of the required over-all length.

The instrument which has been described is especially adapted for operation upon the aortic valve. However, all that is required to convert the instrument to a bicuspid valve dilator is to remove the tricuspid-type operating head and substitute a bicuspid-type head. No illustrative example of the bicuspid-type operating head is presented in this disclosure, because the only modification of the tricuspid-type head consists in reduction of the fixed fins of the nose-piece and the expansible and contractible parting members with their actuating mechanism from three in number to two.

Operational use of the tricuspid-type instrument in relief of a stenotic aortic valve should be readily understood from consideration of the disclosures in Figs. 27 to 29B. Preliminary preparation of the patient for the operation is a matter of usual practice and will not be discussed. It should be stated, however, that stop screw 69 of the manipulating mechanism of the instrument should be adjusted to regulate the degree of expansion of parting members 42 of operating head 30 in accommodation to the internal diameter of the aortic valve as judged from external examination of the heart. Then, locking stop member 72 must be set in locking position to prevent accidental premature closing of the power lever 65 and handle 63. Parting members 42 of operating head 30 will be in collapsed condition through the automatic effect of spring 68. The instrument is now ready for use.

Principal steps in the actual operation upon an aortic valve commence with the usual thoracotomy incision with entrance into the chest via the fourth or fifth interspace. After opening the pericardium, there then follows the making of an incision in the heart wall as shown in Fig. 27 with purse-string control of bleeding. This incision is located preferably midway between the apex of the heart and the coronary sulcus and opens into the left ventricle. Now, the guide member 34 is introduced into the left ventricle through the incision in a manner which will now be described.

While holding the instrument in a position of readiness with nose-piece 38 of operating head 30 facing the heart wall incision and fairly close thereto, the surgeon inserts the bead 88 of guide member 34 through the incision as the purse-string suture is briefly loosened. By tightening the said suture again just as soon as bead 88 has entered the heart, there should be no bleeding at the incision. The surgeon now advances the guide member slowly and carefully in a direction calculated to bring the beaded end thereof into registration with the valve orifice. It is largely a matter of feeling his way blindly through the heart cavity. When contact with the bulge in the muscular part of the ventricular septum or any other obstruction is felt, he changes direction to by-pass this obstruction. Eventually, contact with the valve should be sensed, and, if further resistance to forward pressure suddenly ceases, it is quite likely that the valve orifice has been penetrated. However, the surgeon must be sure of this before proceeding with insertion of the operating head of the instrument, so he then reaches up and around the top of the heart with his free hand and compresses the aorta with thumb and finger in an effort to feel the bead 88 (Fig. 29C). If successful, he is ready to proceed with the rest of the operation. The purse-string suture is now loosened as the operating head 30 of the instrument is inserted through the incision, and the suture is re-tightened to close the incision on the neck 31. All that is required now is to slide operating head 30 along the track constituted by guide member 34. When contact of the entering wedge 40 of nose-piece 38 of the operating head with the valve orifice is felt, the surgeon adjusts the instrument angularly about the axis of operating head 30 so that fixed fins 41 should register with the adhered margins of the valve cusps. Since these margins have the same angular arrangement in all human hearts, it usually is possible to effect accurate registration through deliberate angular adjustment of the instrument. However, any slight displacement should be accommodated for by the swiveling of operating head 30 on neck 31 after entering wedge 40 has initiated parting action on the commissures that fuse the cusp margins together, because the fixed fins 41 of nose-piece 38 will tend to drift rotationally into the crevices between cusps which have been reopened by fracture of the centrally located portions of the disease processes. The surgeon now advances the instrument slowly and steadily until it is felt that expansible parting members 42 have penetrated the valve to a sufficient degree. During this advance, fixed fins 41 will have made a substantial start toward complete fracture of the disease processes, which is done in the new, safer way by exertion of pressure in three directions at each commissure. Due to their wedge-shaped cross-section there will be tangential pressure in the plane of the cusps. Then, there will be radial and forward movement of the fins to exert resultant pressure in an oblique direction as the forwardly tapered fracturing edges of the fins advance. The surgeon is now ready to dilate the valve by expanding the parting members 42, but must first turn locking stop member 72 until slots 70 and 73' are in registration. The instrument is now unlocked. Closing of power lever 65 on handle 63 to the limit determined by stop screw 69 results in the desired expansion of parting members 42. Since these members 42 move radially outward and forwardly, and are wedge-shaped in cross-section, the oblique parting action performed by the fixed fins 41 will be duplicated but to a greater radial extent, which should extend the commissure relief clear out to the valve cuff.

During this valvular operation, some operators guard against brain embolization by intermittently ligating the great neck vessels near the aortic arch.

When the operating head has been withdrawn from the valve and has arrived at the heart wall incision, the purse-string suture is loosened to permit extraction of both operating head 30 and guide member 34, after which the incision is sutured.

Successful relief of the stenotic valve is evidenced by the immediate increased turbulence or thrill felt over the valve area, and by the actual fracture sensation transmitted to the surgeon's fingers through the instrument; and indeed, occasionally, an audible "crack" is noted at the time of fracture. Also, often, an increased fullness of pulse and pulse pressure is noted by the anesthetist.

During the operation, the greatest length of time is consumed in gaining access to the interior of the heart and then locating and penetrating the orifice of the affected valve by the guide member. When these steps have been accomplished, only about ninety seconds elapse from the time that the operating head of the instrument enters the left ventricle until it has been withdrawn following completion of the fracture step.

It is preferred to slightly taper the outer fracturing edge of each movable parting member 42 of operating head 39 toward each end from the center, as shown in large scale Fig. 26, to augment the oblique parting motion primarily imparted by links 43 and 44. This feature is to be understood to apply to all embodiments of the invention although not shown in the other views.

It will be understood that it is intended to cover all changes and modifications of the examples of the invention herein chosen for the purpose of illustration which do not constitute departures from the spirit and scope of the invention.

Having thus described the invention, we claim:

1. A dilator instrument to fracture the fused cusp margins of a stenotic heart valve comprising: an elongated operating head including a body adapted to be aligned with the valve axis, and plural parting members arranged about the axis of the said body in equiangularly spaced relation and being wedge-shaped in cross-section to form outwardly presented axially extending acute blades having dull outer fracturing edges for penetration of the fused valve cusp margins; and manipulating means for the operating head.

2. A dilator instrument as defined in claim 1, wherein the parting members are affixed to the operating head body and have their fracturing edges inclined forwardly and inwardly in oblique relation to the axis of said body.

3. A dilator instrument as defined in claim 1, wherein the parting members are radially expansible and collapsible with respect to the operating head body, and wherein the manipulating means for the operating head includes means to expand the parting members radially and to move them forward simultaneously to cause oblique resultant stroking movement of the fracturing edges of said members.

4. A dilator instrument to fracture the fused cusp margins of a stenotic heart valve comprising: an elongated operating head including a nose-piece having a forwardly tapered entering wedge and plural radially projecting axially extending fixed parting members of wedge-shaped cross-section arranged equiangularly about the axis of the operating head to form outwardly presented axially extending acute blades having forwardly beveled dull outer fracturing edges; and manipulating means for said operating head.

5. A dilator instrument as defined in claim 4, wherein the beveled fracturing edges of the fixed parting members merge smoothly into the tapered face of the entering wedge.

6. A dilator instrument as defined in claim 4, wherein movable parting members equalling the fixed parting members in number are arranged about the axis of the operating head in rear of and in alignment with said fixed parting members, said movable parting members being elongated axially with respect to the operating head and wedge-shaped in cross-section to form acute outwardly presented axially extending blades having dull outer fracturing edges; and wherein means is provided to expand said parting members radially beyond the said fixed parting members and simultaneously move them forwardly to cause oblique resultant motion of the fracturing edges of said movable parting member blades.

7. A dilator as defined in claim 6, wherein means is provided to collapse the movable parting members following expansion into positions wherein their outer fracturing edges are substantially flush with the outer fracturing edges of said fixed parting members.

8. A dilator instrument to fracture the fused cusp margins of a stenotic heart valve comprising: an operating head including an elongated body, plural parting members of wedge-shaped cross-section arranged about the axis of said body in equiangularly spaced relation to form outwardly presented acute axially extending blades having dulled outer fracturing edges, means to mount each parting member on the said body for radial expansion and contraction and for simultaneous axial movement and being in the form of a pair of straight links arranged in tandem with one end of each pivotally connected to the corresponding parting member and the other end pivotally connected to said body at axially spaced points, a collar slidable on said body, and a connecting link terminally pivoted to said collar and to each parting member respectively and being so disposed that when said collar and body are relatively adjusted axially in opposite directions the parting members will be alternately expanded outward and forward from said body and then collapsed toward the same; supporting means for the operating head; manipulating mechanism affixed to said supporting means remote from the said operating head and including power generating means; and power transmission means connecting said power generating means to the operating head to produce relative sliding movement of the body and collar thereof.

9. A dilator instrument as defined in claim 8, wherein the supporting means for the operating head is a tubular neck in which the body of said operating head is slidably fitted at the forward end thereof and to which the collar of said operating head is secured against sliding movement; and wherein the power transmission means is connected to said body of the operating head.

10. A dilator instrument as defined in claim 9, wherein the power transmission means is in the form of an elongated element of non-changing length extending lengthwise in the tubular supporting neck.

11. A dilator instrument as defined in claim 9, wherein the power generating means of the manipulating mechanism is constituted by a handle affixed to the rear end of the tubular supporting neck and a power lever pivoted to said handle with one arm arranged substantially coextensive therewith and the other arm pivotally connected to said power transmission element.

12. A dilator instrument as defined in claim 10, wherein the tubular supporting neck is curved and the power transmission element is sufficiently flexible to operate efficiently therein.

13. A dilator instrument as defined in claim 11, wherein the connecting links of the operating head and the power lever and handle of the manipulating mechanism are so constructed and arranged that compression of said power lever and handle will cause expansion of the movable parting members of the operating head; and wherein spring means is provided on the manipulating mechanism to urge said power lever and handle apart upon release of manual pressure thereon to automatically collapse said movable parting members.

14. A dilator instrument as defined in claim 11, wherein adjustable stop means is provided to regulate the maximum degree of separation of the power lever and handle of the manipulating mechanism.

15. A dilator instrument as defined in claim 11, wherein releasable locking stop means is provided on the manipulating mechanism to prevent accidental closing of the power lever and handle upon each other.

16. A heart valve instrument comprising an operating head having a bearing bore and an attenuated flexible and resilient guide member closely fitting said bore and projecting forwardly from said operating head in a manner whereby said guide member may be directed firmly and with precison in locating the valve orifice by manipulation of said operating head.

17. A heart valve instrument as defined in claim 16, wherein the front end of the guide member is provided with a smoothly rounded protective bead.

18. A heart valve instrument as defined in claim 16, wherein the guide member is slidable longitudinally in the bore of the operating head to permit adjustment of its effective protruding length and to permit said guide member to serve as a guide track for operational advance of the operating head into registration with the valve orifice.

19. A dilator instrument to fracture the fused cusp margins of a stenotic heart valve comprising: an operating head including an elongated body, plural parting members of wedge-shaped cross-section arranged about the axis of said body in equi-angularly spaced relation to form outwardly presented acute axially extending blades having dull outer fracturing edges, means to mount each parting member on said body for radial expansion and contraction and for simultaneous axial movement and being in the form of a pair of straight links arranged in tandem with one end of each pivotally connected to the corresponding parting member and the other end pivotally connected to said body at axially spaced points, a collar slidable on said body, and a connecting link terminally pivoted to said collar and to each parting member respectively and being so disposed that when said collar and body are relatively adjusted axially in opposite directions the parting members will be alternately expanded outward and forward from said body and then collapsed toward the same, said body and parting members being provided with registering longitudinal slots in their opposed surfaces to countersink the respective mounting and connecting links when the parting members are collapsed on said body; supporting means for the operating head; manipulating mechanism affixed to said supporting means remote from the said operating head and including power generating means; and power transmission means connecting said power generating means to the operating head to produce relative sliding movement of the body and collar thereof.

20. A dilator instrument to fracture the fused cusp margins of a stenotic heart valve comprising: an elongated operating head including a body adapted to be aligned with the valve axis, and plural parting members arranged about the axis of said body in equiangularly spaced relation and being wedge-shaped in cross-section to form outwardly presented acute axially extending blades having dull outer fracturing edges for penetration of the fused valve cusp margins; manipulating means for the operating head; said operating head having a longitudinal bearing bore; and an attenuated flexible and resilient guide member closely fitting said bore and projecting forwardly from said operating head in a manner whereby said guide member may be directed firmly and with precison in locating the valve orifice by manipulation of said operating head.

21. A dilator instrument as defined in claim 20, wherein the guide member is slidable in the bearing bore of the operating head to permit adjustment of its effective protruding length and to permit said guide member to serve as a guide track along which the operating head may be firmly and accurately guided toward the heart valve orifice by manipulation of said operating head.

22. A dilator instrument to fracture the fused cusp margins of a stenotic heart valve comprising: an operating head including an elongated body, plural parting members of wedge-shaped cross-section arranged about the axis of said body in equiangularly spaced relation to form outwardly presented acute axially extending blades having dull outer fracturing edges, means to mount each parting member on said body for radial expansion and contraction and for simultaneous axial movement and being in the form of a pair of straight links arranged in tandem with one end of each pivotally connected to the corresponding parting member and the other end pivotally connected to said body at axially spaced points, a collar slidable on said body, and a connecting link terminally pivoted to said collar and to each parting member respectively and being so disposed that when said collar and body are relatively adjusted axially in opposite directions the parting members will be alternately expanded outward and forward from said body and then collapsed toward the same; supporting means for the operating head in the form of a tubular neck in which the body of said operating head is slidably fitted at the forward end thereof and to which the collar of said operating head is secured against sliding movement; manipulating mechanism affixed to the rear end of the supporting tubular neck; power generating means included in said manipulating mechanism; power transmission means connecting said power generating means to the operating head to produce relative sliding movement of the body and collar thereof; the body of the operating head, the power transmission means, and the manipulating mechanism being provided with axially aligned bearing bores opening through the front and rear ends thereof; and an attenuated flexible and resilient guide member closely fitting said aligned bores and projecting forwardly from the operating head and rearwardly from the manipulating mechanism and being slidable therethrough whereby said guide member may have its forward end directed in projection from the operating head by remote control at the rear end thereof.

23. A dilator instrument as defined in claim 22, wherein the slidable collar of the operating head is slightly swiveled in its connection with the tubular supporting neck of the manipulating means to permit automatic adjustment of the parting members of the operating head in their registration with the fused margins of the valve cusps.

24. A dilator instrument to fracture the fused cusp margins of a stenotic heart valve comprising: an elongated operating head including a body adapted to be aligned with the valve axis for penetration thereof; plural parting members arranged about the axis of said body in equiangularly spaced relation and being wedge-shaped in cross-section to form outwardly presented axially extending acute blades having dull fracturing outer edges for penetration of the fused valve cusp margins; and manipulating means for the operating head having limited swiveled connection with the latter to permit automatic adjustment of the fracturing edges of the parting members with the respective fused margins of the valve cusps during registration therewith.

25. A surgical dilator instrument comprising: an operating head including an elongated body, plural movable parting members mounted on said body for radial expansion and contraction relative thereto, a collar longitudinally slidable on said body, and means responsive to relative sliding adjustment of said body and collar to expand and contract said parting members; manipulating mechanism for the operating head including a tubular supporting neck connected to the collar on the body of said operating head and arranged in rearward prolongation thereof; power generating means located at the rear end of the supporting neck and including a thrust plunger movable longitudinally with respect to said neck; and power transmission means including a coil spring extending longitudinally through said supporting neck in interposed relation to the opposed ends of the operating head body and the thrust plunger of the power generating means, and a tie wire extending longitudinally through said coil spring and having its ends connected to said operating head body and thrust plunger in a manner to bind the convolutions of the coil spring in closed contact throughout and thereby prevent any elongation of said coil.

26. A dilator instrument as defined in claim 25, wherein the tubular supporting neck of the manipulating mechanism is longitudinally curved and the tie wire of the power transmission means is located along the inside of the longitudinal curvature of said neck.

27. A dilator instrument as defined in claim 25, wherein means for anchoring the respective ends of the tie wire to the operating head body and thrust plunger includes tensioning and compression members having longitudinal screw-threaded engagement with said body and plunger to permit longitudinal adjustment with respect thereto, and means for securing engagement of said tensioning and compression members with the corresponding ends of the tie wire.

28. A dilator instrument as defined in claim 27, wherein each tensioning and compression member has a longitudinal peripheral slot and a cross slot intersecting the same, and wherein each end of the tie wire is adapted to fit in the longitudinal slot in the corresponding tensioning and compression member and is provided with a head to fit in the cross slot of said member in a manner to anchor said wire against longitudinal displacement with respect thereto.

29. A dilator instrument as defined in claim 28, wherein a locking sleeve is axially adjustable on each tensioning and compression member and adapted to overlie the terminal head of the tie wire in assembled position therein to prevent disengagement of said head with the cross slot in said member.

References Cited in the file of this patent
UNITED STATES PATENTS

| Number | Name | Date |
|---|---|---|
| 1,331,737 | Ylisto | Feb. 24, 1920 |
| 1,878,671 | Cantor | Sept. 20, 1932 |
| 2,137,121 | Greenwald | Nov. 15, 1938 |